Oct. 2, 1956    T. L. FAWICK    2,765,061
ASSEMBLY FOR CLUTCHES AND BRAKES
Filed Aug. 9, 1952    2 Sheets-Sheet 1

INVENTOR.
THOMAS L. FAWICK
BY Willard D. Eakin
ATTORNEY

Oct. 2, 1956  T. L. FAWICK  2,765,061
ASSEMBLY FOR CLUTCHES AND BRAKES
Filed Aug. 9, 1952  2 Sheets-Sheet 2

INVENTOR.
THOMAS L. FAWICK
BY Willard D. Eakin
ATTORNEY

UNITED STATES PATENT OFFICE 2,765,061
Patented Oct. 2, 1956

2,765,061

ASSEMBLY FOR CLUTCHES AND BRAKES

Thomas L. Fawick, Cleveland, Ohio, assignor, by mesne assignments, to Fawick Corporation, a corporation of Michigan Application August 9, 1952, Serial No. 303,593

1 Claim. (Cl. 192—88)

This invention relates to clutches and brakes having a disc-shaped fluid-distensible element for effecting frictional engagement of the clutch or brake.

Its chief obects are to provide high uniformity of frictional-engagement pressure over large areas of frictional contact; to provide improved dissipation of frictional heat, by ventilation, in an assembly of this type; and to provide durability, economy, simplicity, and facility of assembly and disassembly.

Figure 1:
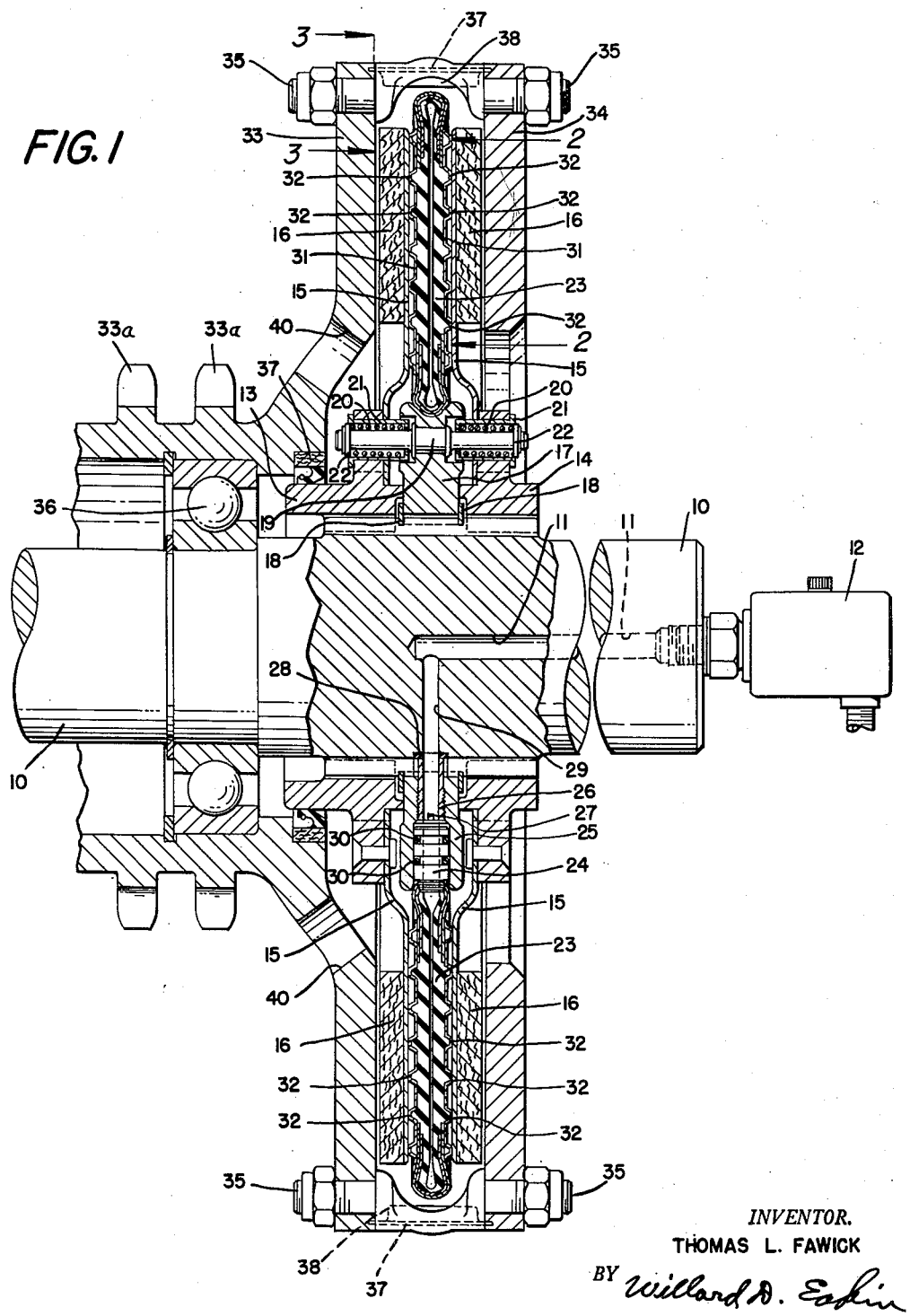
Fig. 1 is an axial section of an assembly embodying my invention in its preferred form for light and moderately heavy duty.
Figure 2:
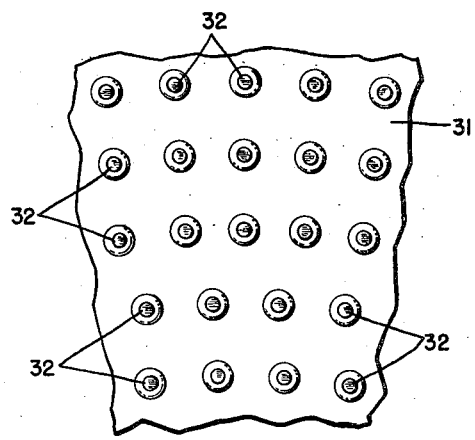
Fig. 2 is a face view, on a large scale, of a pressure plate as viewed in the direction of the arrows 2, 2 in Fig. 1.
Figure 3:
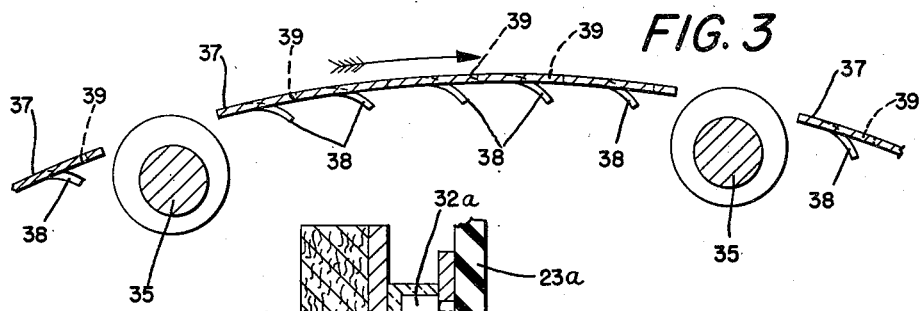
Fig. 3 is a section on line 3—3 of Fig. 1.

The embodiment shown in Figs. 1 to 3 comprises a shaft 10 having suitable journal bearings, not shown, and formed with an axial bore 11, to which is coupled a rotary fluid seal 12 for supplying pressure fluid from a non-rotating source, for actuation of the clutch or brake. The shaft 10 can be either the driving element or the driven element of the assembly.

Slip-splined upon the shaft 10, with clearance at the extremity of each spline, as shown in Fig. 1, are a pair of hub members 13, 14, to each of which is secured, as by welding, an annular, generally disc-shaped, base plate, 15, for an annular, frictional-engagement wear member 16, vulcanized or otherwise secured to the base plate. The invention is not wholly limited, however, to the members 16 being continuous annuli, as their annular base plates 15 are well adapted to sustain their centrifugal force.

Between the hub members 13, 14 a bag-centering ring 17 is splined upon the shaft 10, but with a loose fit, so that it will not be required to sustain any of the torque. The ring 17 is held in fixed position axially of the shaft by snap-rings 18, 18 mounted in respective sets of grooves in the splines of the shaft.

For constantly urging the hub members 13, 14 toward abutted relation to the bag-centering ring 17, that ring has mounted in it a circumferentially spaced set of spring-post pins such as the pin 19, each such pin having mounted upon each of its spring-post ends a compression spring 20 which bears at its inner end against the floor of a spring-cup 21 and at its outer end against a spring-seat washer 22 secured upon the end of the spring-post.

The washers 22 slidably fit in the respective spring-seat cups and the latter are formed with respective external outer-end flanges engaging the outer faces of the hub members 13, 14 for urging them toward each other.

A disc-shaped, annular, fluid-distensible bag 23 is provided with a substantially rigid metal or hard-rubber inlet-outlet stem 24 adapted to be slipped into a socket element 25 of the bag-centering ring 17, the said socket element having communication with a nipple member 26 which is formed with screw-driver notches such as the notch 27, is threaded into a radial hole through the ring 17, and sealingly clamps a gasket 28, which seals the nipple 26 to the shaft 10 around a radial hole 29 formed in the shaft and communicating with the shaft's axial bore 11.

The inlet-outlet stem 24 of the bag is formed with annular grooves for soft-packings or O-rings 30, 30, so that the bag is mounted in sealed communication with the fluid-supply passages of the shaft by simply inserting the stem 24 in its socket and then "buttoning" the bag onto the ring 17, the latter being formed with an annular groove on its outer edge face so that the recoil of the resilient inner peripheral zone of the bag then holds it in place.

The bag 23, as shown, is primarily of rubber, with fabric reinforcement of its inner and outer peripheries.

Secured as by vulcanization to each of the annular outer faces of the bag is a metal face-plate 31, which is of about the same radial extent as the wear-shoe ring 16. These annular plates 31 sustain the centrifugal force of the bag and, in order that they may also protect the bag from frictional heat by providing cooling ventilation the plates 31 are formed on their outer faces with a field of spaced apart projections 32, 32 for engaging the base plates 15, 15 of the frictional members for effecting clutch or brake engagement. The spaces between the projections provide for outward centrifugal flow of air, a substantial amount of air entering through the illustrated clearances of the splines and passing outward between the ring 13 or 14 and the ring 17 as the rings 13 and 14 are moved away from the ring 17 by distension of the bag 23, with consequent forcing apart of the plates 15, 15 and their wear members 16, 16 for clutch or brake engagement. Also, because the space between each plate 15 and its wear member 16, around the projections 32, is always occupied by air, whether the air is rapidly moving outward or not, the construction provides effective air insulation against passage of frictional heat from the wear member 16 to the bag, and such passage of heat also is small because of the smallness of the areas of heat-conductive contact of the projections 32 with the plates 15, 15. The projections 32 can readily be formed by stamping them out from an initially flat plate and the resulting indentations of the inner face of the plate, filled with rubber, in the mold-vulcanizing of the bag and plates as a unit, provide a radial interlock of those elements.

The frictional-engagement faces for coaction with the friction elements 15 are provided by friction rings 33, 34 straddling the bag assembly above described and secured to each other in axially spaced-apart relation by spacer bolts 35, 35 at their outer peripheries.

The ring 33 is formed with sets of sprocket teeth 33a, 33a and is journaled upon the shaft 10 by a bearing 36. An oil-seal 37 is mounted between the hub of the ring 33 and the hub member 13, so that oil from the bearing 36 can not migrate to and lubricate the adjacent pair of mating frictional-engagement surfaces.

Near their outer peripheries the friction rings 33, 34 are formed on their inner faces with respective annular grooves in which are mounted the side margins of a circumferentially spaced set of stamped sheet metal arcuate centrifugal blower members 37, 37, in alternation with the clamping bolts 35.

Each of these members has a set of stamped-out wings or vanes 38, 38, Fig. 3, inclined in such inward direction as to drive air outward through the openings 39, 39 that are formed by the stamping out of the vanes.

The inner periphery of the friction ring 34 is of greater diameter than, and consequently is radially spaced outward from, the hub member 14, for admission of air in large volume directly to the heat-generating friction faces at that side of the device, and for admission of air to the friction faces at the left-hand side of the device the friction ring 33 is formed with a circumferentially spaced set of ventilating holes 40, 40.

The mode of operation will be manifest from the foregoing description.

Figure 4:
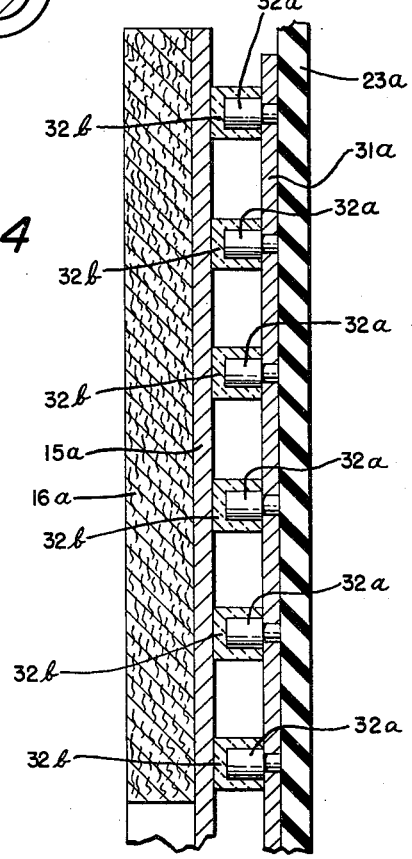
Fig. 4 is a fragmentary axial section of parts inclusive of an alternative type of presser plate adapted for heavy duty and provided with ventilating and heat-insulating means for protecting the fluid-distensible member from damaging effects of frictional heat.

In the modification shown in Fig. 4 the bag, 23a, has mold-vulcanized to each of its outer side faces a metal plate such as the plate 31a formed with holes in which respectively are fitted, and held by spot-welding, the stems of a field of studs 32a, 32a. On each of these studs is fitted a cup-shaped insulating member 32b, for contacting, and spacing from the bag's facing-plate 31a, the base plate 15a of the wear member 16a.

Figure 5:
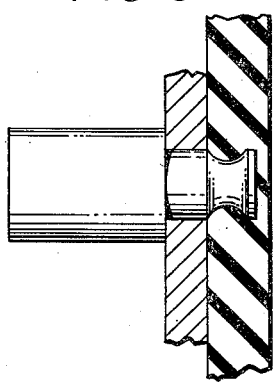
Fig. 5 is a fragmentary section, on a large scale, illustrating an alternative type of mounting for heat-insulating spacer elements.

In the embodiment shown in Fig. 5, instead of being welded in place, the stems of the stud members project through the bag's face plate and into the rubber of the bag, and are of waisted form in their projecting parts, so that the rubber interlocks with them in the mold-vulcanizing operation, to hold them in place.

As to the studs of either Fig. 4 or Fig. 5 their anchorage does not have to be strong because they are not subjected to the torque that is sustained by the assembly, and when they are functioning the only pressure upon them is lengthwise of them.

Other modifications are possible within the scope of the invention as defined by the appended claims.

I claim:

An assembly comprising two relatively rotatable structures adapted for torque-sustaining frictional engagement with each other, one of said structures having an annular, frictional-engagement face surrounding and disposed transversely with relation to the axis of rotation and the other of said structures comprising a frictional-engagement member mounted for axial movement into engagement with said frictional-engagement face, a diaphragm formed primarily of highly stretchable material for so moving said frictional-engagement member, and, between said diaphragm and said member, for applying the force of the diaphragm to the said member, an annular presser member surface bonded in face-to-face relation to and thus wholly supported by said diaphragm for sustension by said presser member of centrifugal force of said diaphragm, said presser member having sufficient inextensibility to sustain that centrifugal force and its own substantially without stretching, said presser member being a plate having stamped out projections for engaging the said frictional-engagement member, space between said projections providing air-insulation against transfer of heat, and the material of the diaphragm being interlocked with walls of recesses formed in the adjacent face of the plate by the stamping out of its projections.

References Cited in the file of this patent

UNITED STATES PATENTS

| Re. 21,984 | Hirsch et al. | Dec. 23, 1941 |
| 2,254,074 | Klaue | Aug. 26, 1941 |
| 2,307,456 | Fawick | Jan. 5, 1943 |
| 2,381,166 | Hollerith | Aug. 7, 1945 |
| 2,381,941 | Wellman et al. | Aug. 14, 1945 |
| 2,382,570 | Kraft | Aug. 14, 1945 |
| 2,393,010 | Arnold et al. | Jan. 15, 1946 |
| 2,517,972 | Cardwell et al. | Aug. 8, 1950 |
| 2,584,190 | Danly et al. | Feb. 5, 1952 |
| 2,600,410 | Lyon | June 17, 1952 |
| 2,612,909 | Keller | Oct. 7, 1952 |
| 2,619,212 | Cardwell et al. | Nov. 12, 1952 |
| 2,659,468 | Hobbs | Nov. 17, 1953 |

FOREIGN PATENTS

| 596,908 | Great Britain | Jan. 14, 1948 |
| 980,605 | France | Dec. 27, 1950 |